United States Patent
Surnilla et al.

(10) Patent No.: US 6,829,885 B2
(45) Date of Patent: Dec. 14, 2004

(54) NOX TRAP EFFICIENCY

(75) Inventors: Gopichandra Surnilla, West Bloomfield, MI (US); Grant Alan Ingram, West Lafayette, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 09/992,223

(22) Filed: Nov. 19, 2001

(65) Prior Publication Data

US 2003/0093988 A1 May 22, 2003

(51) Int. Cl.⁷ .................................................. F01N 3/00
(52) U.S. Cl. .............................. 60/274; 60/285; 60/286
(58) Field of Search ........................... 60/274, 276, 277, 60/285, 286, 301

(56) References Cited

U.S. PATENT DOCUMENTS

| | | | | |
|---|---|---|---|---|
| 5,437,153 A | * | 8/1995 | Takeshima et al. | 60/286 |
| 5,595,060 A | * | 1/1997 | Togai et al. | 60/285 |
| 5,743,084 A | * | 4/1998 | Hepburn | 60/274 |
| 5,771,685 A | | 6/1998 | Hepburn | |
| 5,894,725 A | | 4/1999 | Cullen et al. | |
| 6,105,365 A | * | 8/2000 | Deeba et al. | 60/274 |
| 6,119,449 A | * | 9/2000 | Köhler | 60/285 |
| 6,134,883 A | * | 10/2000 | Kato et al. | 60/276 |
| 6,263,666 B1 | * | 7/2001 | Kubo et al. | 60/277 |

* cited by examiner

Primary Examiner—Tu M. Nguyen
(74) Attorney, Agent, or Firm—Julia Voutyras

(57) ABSTRACT

A more accurate method for determining a NOx storage efficiency of an exhaust gas aftertreatment device is presented. The method teaches determining NOx storage efficiency as a function of available LNT NOx storage capacity, which is calculated based on a ratio of an instantaneous value of an amount of NOx stored in the device and total device storage capacity at present operating conditions. Using this method prevents overfilling of the device and inefficient purging, thus improving emission control and fuel economy.

19 Claims, 3 Drawing Sheets

NOX TRAP EFFICIENCY

FIELD OF INVENTION

The present invention relates to a system and a method for controlling a lean-burn internal combustion engine, and more particularly, to estimating instantaneous NOx conversion efficiency of the LNT.

BACKGROUND OF THE INVENTION

Internal combustion engines are typically coupled to an emission control device known as a three-way catalytic converter (TWC) designed to reduce combustion by-products such as carbon monoxide (CO), hydrocarbon (HC) and oxides of nitrogen (NOx). Engines can operate at air-fuel mixture ratios lean of stoichiometry, thus improving fuel economy. For lean engine operation, an additional three-way catalyst commonly referred to as a Lean NOx Trap (LNT), is usually coupled downstream of an upstream catalytic converter. The LNT stores exhaust components, such as oxygen and NOx, during lean operation. When the LNT is filled to a predetermined capacity, stored exhaust gas constituents are typically reduced and released (purged) by switching to rich or stoichiometric operation, i.e., by increasing the ratio of fuel to air and thereby increasing the amount of reductant such as hydrocarbon (HC) and carbon monoxide (CO) present in the exhaust gas mixture entering the LNT. Once the purge is completed, lean operation resumes again.

Prior art teaches monitoring the amount of NOx stored in the LNT as a result of lean operation, and, once that amount predetermined value, purging the LNT. Typically, the amount of NOx stored is determined based on the LNT NOx storage efficiency and the amount of NOx generated by the engine.

The inventors herein have recognized that the LNT efficiency may vary widely with changes in the LNT temperature, overall storage capacity, space velocity, etc. This variability makes it very difficult to obtain an accurate estimate of the LNT NOx storage efficiency, which may cause inaccuracies in the estimate of the total amount of NOx stored in the LNT. If the amount of NOx stored in the LNT since the last purge is underestimated, lean operation may continue after the LNT is full, and result in tailpipe NOx emissions. On the other hand, if the amount of NOx is overestimated, fuel economy may be reduced due to unnecessary purging.

The inventors have further recognized that a more accurate estimate of the amount of NOx stored in the LNT as a result of lean operation can be obtained by evaluating the LNT NOx storage efficiency as a function of available LNT NOx storage capacity. In that case, the efficiency would be directly related to the number of available storage cites in the LNT, and not subject to variability in the overall LNT NOx storage capacity or operating conditions such as temperature or space velocity.

SUMMARY OF THE INVENTION

In view of the above, a system and a method are provided for obtaining a highly accurate estimate of the amount of NOx stored in the LNT as a result of lean operation.

In accordance with the present invention, method of determining an amount of NOx stored in an exhaust gas aftertreatment device coupled downstream of a lean-burn internal combustion engine, includes: estimating NOx storage efficiency of the device based on a percent NOx capacity filled; and calculating the amount of NOx stored in the device based on said estimated NOx storage efficiency of the device.

An advantage of the present invention is improved emission control, due to the fact that a more accurate estimate of the amount of NOx stored in the LNT will prevent overfilling of the LNT.

Another advantage of the present invention is improved fuel economy, since a more accurate estimate of the amount of NOx stored in the LNT will prevent unnecessary purging.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT (S)

As will be appreciated by those of ordinary skill in the art, the present invention is independent of the particular underlying engine technology and configuration. As such, the present invention may be used in a variety of types of internal combustion engines, such as conventional engines in addition to direct injection stratified charge (DISC) or direct injection spark ignition engines (DISI).

Figure 1:
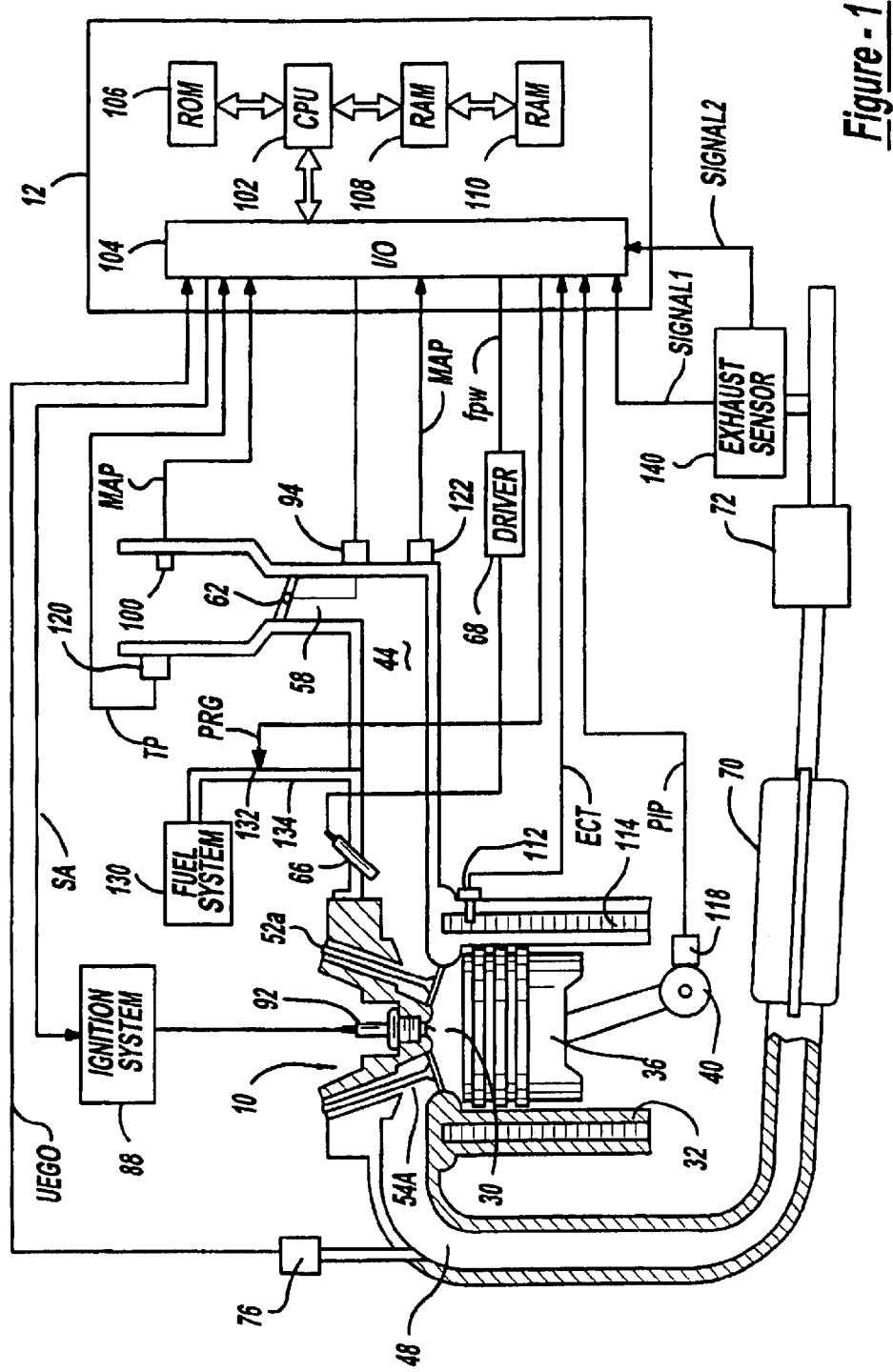
FIG. 1 is a block diagram of an internal combustion engine illustrating various components related to the present invention.

A block diagram illustrating an engine control system and method for a representative internal combustion engine according to the present invention is shown in FIG. 1. Preferably, such an engine includes a plurality of combustion chambers only one of which is shown, and is controlled by electronic engine controller 12. Combustion chamber 30 of engine 10 includes combustion chamber walls 32 with piston 36 positioned therein and connected to crankshaft 40. In this particular examples the piston 36 includes a recess or bowl (not shown) for forming stratified charges of air and fuel. In addition, the combustion chamber 30 is shown communicating with intake manifold 44 and exhaust manifold 48 via respective intake valves 52a and 52b (not shown), and exhaust valves 54a and 54b (not shown). A fuel injector 66 is shown directly coupled to combustion chamber 30 for delivering liquid fuel directly therein in proportion to the pulse width of signal fpw received from controller 12 via conventional electronic driver 68. Fuel is delivered to the fuel injector 66 by a conventional high-pressure fuel system (not shown) including a fuel tank, fuel pumps, and a fuel rail.

Intake manifold 44 is shown communicating with throttle body 58 via throttle plate 62. In this particular example, the throttle plate 62 is coupled to electric motor 94 such that the position of the throttle plate 62 is controlled by controller 12 via electric motor 94. This configuration is commonly referred to as electronic throttle control, (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. In this particular example, sensor 76 is a universal exhaust gas oxygen (UEGO) sensor, also known as a proportional oxygen sensor. The UEGO sensor generates a signal whose magnitude is proportional to the oxygen level (and the air-fuel ratio) in the exhaust gases. This signal is provided to controller 12, which converts it into a relative air-fuel ratio.

Advantageously, signal UEGO is used during feedback air-fuel ratio control in to maintain average air-fuel ratio at a desired air-fuel ratio as described later herein. In an alternative embodiment, sensor 76 can provide signal EGO, exhaust gas oxygen (not shown), which indicates whether exhaust air-fuel ratio is lean or rich of stoichiometry. In another alternate embodiment, the sensor 76 may comprise one of a carbon monoxide (CO) sensor, a hydrocarbon (HC) sensor, and a NOx sensor that generates a signal whose magnitude is related to the level of CO, HC, NOx, respectively, in the exhaust gases.

Those skilled in the art will recognize that any of the above exhaust gas sensors may be viewed as an air-fuel ratio sensor that generates a signal whose magnitude is indicative of the air-fuel ratio measured in exhaust gases.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel layers are thereby formed. The stratum closest to the spark plug contains a stoichiometric mixture or a mixture slightly rich of stoichiometry, and subsequent strata contain progressively leaner mixtures.

In the homogeneous mode, controller 12 activates fuel injector 66 during the intake stroke so that a substantially homogeneous air-fuel mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Lean NOx trap 72 is shown positioned downstream of catalytic converter 70. Both devices store exhaust gas components, such as NOx, when engine 10 is operating lean of stoichiometry. These are subsequently reacted with HC, CO and other reductant and are catalyzed during a purge cycle when controller 12 causes engine 10 to operate in either a rich mode or a near stoichiometric mode.

Controller 12 is shown in FIG. 1 as a conventional microcomputer, including but not limited to: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

Fuel system 130 is coupled to intake manifold 44 via tube 134. Fuel vapors (not shown) generated in fuel system 130 pass through tube 134 and are controlled via purge valve 132. Purge valve 132 receives control signal PRG from controller 12.

Exhaust sensor 140 is a NOx/UEGO sensor located downstream of the LNT. It produces two output signals. First output signal (SIGNAL1) and second output signal (SIGNAL2) are both received by controller 12. Exhaust sensor 140 can be a sensor known to those skilled in the art that is capable of indicating both exhaust air-fuel ratio and nitrogen oxide concentration.

In a preferred embodiment, SIGNAL1 indicates exhaust air-fuel ratio and SIGNAL2 indicates nitrogen oxide concentration. In this embodiment, sensor 140 has a first chamber (not shown) in which exhaust gas first enters where a measurement of oxygen partial pressure is generated from a first pumping current. Also, in the first chamber, oxygen partial pressure of the exhaust gas is controlled to a predetermined level. Exhaust air-fuel ratio can then be indicated based on this first pumping current. Next, the exhaust gas enters a second chamber (not shown) where NOx is decomposed and measured by a second pumping current using the predetermined level. Nitrogen oxide concentration can then be indicated based on this second pumping current. In an alternative embodiment, a separate NOx sensor could be used in conjunction with an air-fuel sensor, which could be a UEGO or a HEGO sensor.

Figure 2:
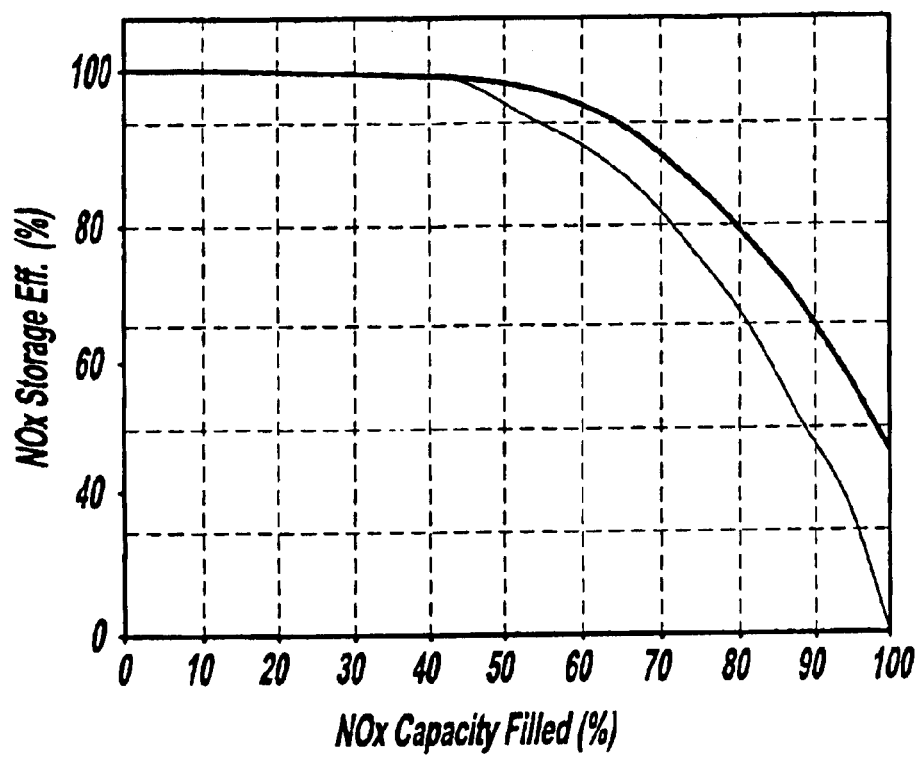
FIG. 2 is a plot of the LNT NOx storage efficiency as a function of the percent LNT NOx capacity filled.

FIG. 2 is a plot of the LNT NOx storage efficiency as a function of the percent LNT NOx capacity filled. The plot shows that as the percent NOx capacity filled increases, i.e., the number of available sites in the LNT decreases, the LNT NOx storage efficiency becomes reduced. The information for this plot is generated under laboratory conditions and is dependent on the physical characteristics of the LNT.

Figure 3:
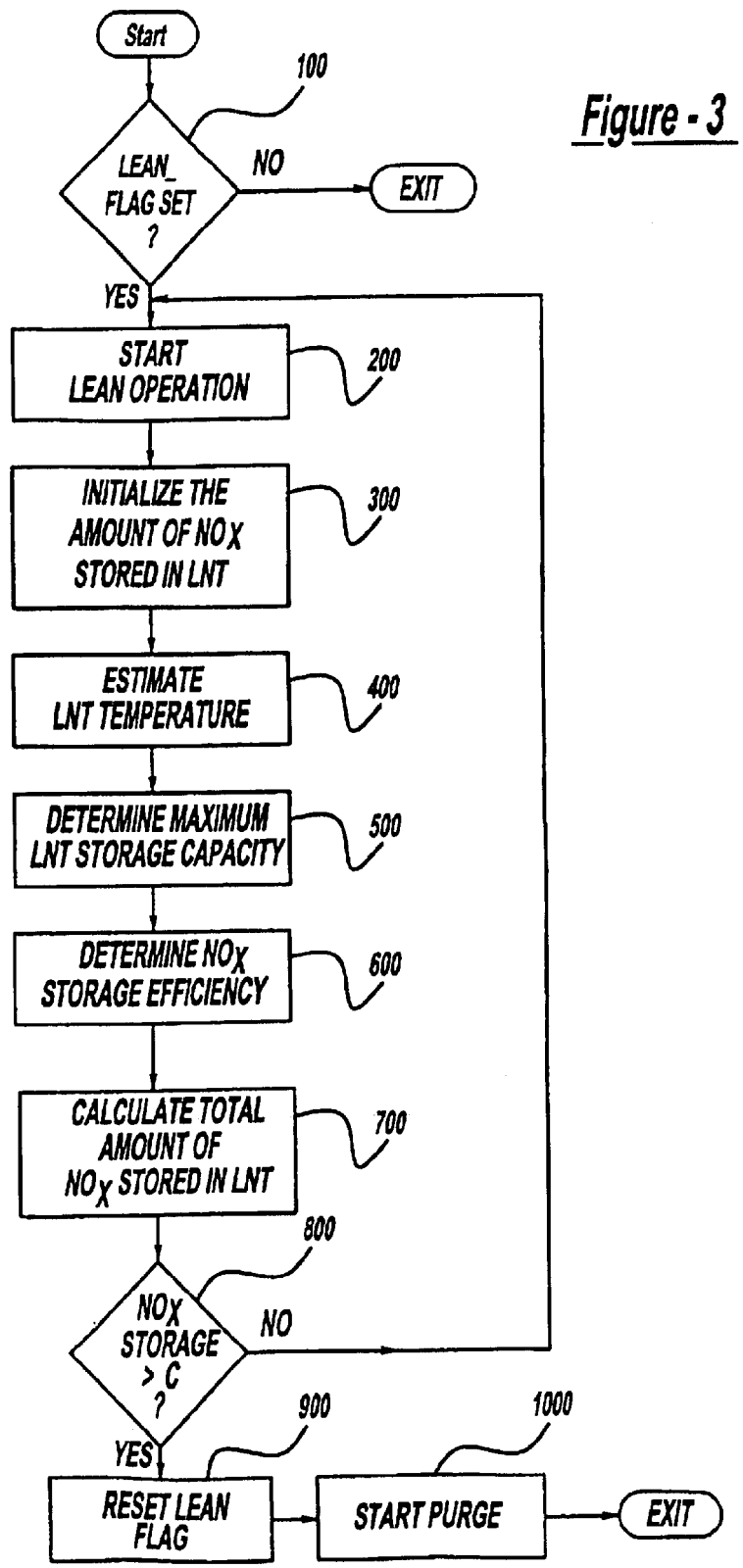
FIG. 3 is a block diagram of the embodiment in which the invention is used to advantage.

The diagram in FIG. 3 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, I parallel, or in some cases omitted. Likewise, the order of processing is not necessarily required to achieve the objects, features and advantages of the invention, but is provided for ease of illustration and description.

Although not explicitly illustrated, one of ordinary skill in the art will recognize that one or more of the illustrated steps or functions may be repeatedly performed depending on the particular strategy being used.

Referring now to FIG. 3, first, in step 100, a determination is made whether LEAN_FLAG is set thus indicating that lean operation should commence. If the answer to step 100 is NO, the routine exits. If the answer to step 100 is YES, the routine proceeds to step 200 wherein lean operation starts. Nest, in step 300, NOx_stored(t), the instantaneous value of an amount of NOx stored in the LNT at any given time is initialized to a small nominal value. Proceeding next to step 400, the operating temperature of the LNT is estimated based on operating conditions, such as engine speed, load, manifold air pressure, etc. Alternatively, the temperature can be determined based on information from a temperature sensor placed at mid-bed of the LNT. Next, in step 500, maximum storage capacity of the LNT, NOx_capacity$_{max}$(T), is determined from a prestored table based on the LNT operating temperature. Alternatively, other factors, such as the LNT aging and contamination, can be taken into account when developing the maximum NOx storage capacity table. Proceeding now to step 600, NOx storage efficiency of the LNT is determined from a prestored table based on percent NOx capacity filled:

$$NOx_{efficiency} = f\left(\frac{NOx\_stored(t-1)}{NOx\_capacity_{max}(T)}\right)$$

Percent NOx capacity filled is a ratio of an instantaneous value of the amount of NOx stored in the LNT during lean operation to the maximum available NOx storage capacity of the LNT at present operating conditions, as determined in step 500. Proceeding now to step 700, a total amount of NOx stored in the LNT as a result of lean operation is calculated as follows:

NOx_stored(t)=NOx_stored(t−1)+FG_$_{NOx}$_rate·NOx$_{efficiency}$(t)·Δt wherein FG_NOx_rate is a feedgas NOx generation rate from the engine determined based on engine operating conditions, such as engine speed, load, air-fuel ratio, mass airflow, etc. Next, in step 800, a determination is made if the total amount of NOx stored in the LNT is greater than a predetermined constant. If the answer to step 800 is yes, the routine proceeds to step 900 wherein the LEAN_FLAG is reset, followed by step 1000, wherein the purge of the LNT commences. The routine then exits.

Alternatively, once the NOx storage efficiency of the LNT is determined as described in step 600, it can be compared with a predetermined calibratable constant to determine whether to purge the LNT. In other words, once the LNT NOx storage efficiency falls below a predetermined value, the engine can switch to rich operation in order to purge the LNT.

Therefore, according to the present invention, it is possible to determine the NOx conversion efficiency of the LNT with more precision by calculating it as a function of the available NOx storage capacity, which in an example embodiment is determined as a ratio of the instantaneous value of the amount of NOx stored in the LNT to the maximum LNT NOx storage capacity at current operating conditions. By correlating the efficiency of the LNT to available storage capacity rather than the prior art method of deriving it based on a total amount of NOx stored in the LNT, changes in the efficiency due to changes in operating conditions, are accounted for. Thus, a more accurate method is obtained, resulting in improved fuel economy and emission control.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A method of determining an amount of NOx stored in an exhaust gas aftertreatment device coupled downstream of a lean-burn internal combustion engine, the method comprising:

estimating NOx storage efficiency of the device based on a percent NOx capacity filled; and calculating the amount of NOx stored in the device based on said estimated NOx storage efficiency of the device.

2. The method as set forth in claim 1 further comprising performing a purge of the device when said calculated amount of NOx stored in the device is above a predetermined value.

3. The method as set forth in claim 1 wherein the exhaust gas aftertreatment device is a three-way catalyst.

4. The method as set forth in claim 3 wherein said three-way catalyst is a lean NOx trap.

5. The method as set forth in claim 1 wherein said percent NOx capacity filled is a function of a ratio of an instantaneous value of an amount of NOx stored in the device to a maximum available NOx storage capacity of the device.

6. The method as set forth in claim 5 wherein said maximum available capacity of the device is determined based on an operating condition.

7. The method as set forth in claim 6 wherein said operating condition is a temperature of the device.

8. The method as set forth in claim 1 wherein said calculating is further based on an amount of NOx generated by the engine.

9. The method as set forth in claim 8 wherein said amount of NOx generated by the engine determined based on an engine operating condition.

10. The method as set forth in claim 9 wherein said engine operating condition is an engine speed.

11. The method as set forth in claim 9 wherein said engine operating condition is a mass airflow.

12. A method for controlling a lean-burn internal combustion engine having an exhaust gas aftertreatment device coupled downstream of the engine, the method comprising:

operating the engine at an air fuel ratio lean of stoichiometry;

determining a NOx storage efficiency of the device based on a percent NOx capacity filled;

calculating a total amount of NOx stored in the device as a result of said lean operation based on said NOx storage efficiency; and changing engine operation to an air-fuel ratio rich of stoichiometry if said calculated amount of NOx exceeds a predetermined value.

13. The method as set forth in claim 12 wherein the device is a lean NOx trap.

14. The method as set forth in claim 12 wherein said percent NOx capacity filled is a function of a ratio of an instantaneous value of an amount of NOx stored in the device to a maximum available NOx storage capacity of the device.

15. A system for controlling an internal combustion engine, comprising:

an exhaust gas aftertreatment device coupled downstream of the engine; and a controller for operating the engine at an air-fuel ration lean of stoichiometry, determining a NOx storage efficiency of the device based on a ratio of an instantaneous value of an amount of NOx stored in said device and a maximum NOx storage capacity of said device, said controller changing engine operation to an air-fuel ratio rich of stoichiometry if said NOx storage efficiency of the device is below a preselected constant.

16. The system as set forth in claim 15 wherein said device is a three-way catalyst.

17. The system as set forth in claim 15 wherein said three-way catalyst is a lean NOx trap.

18. The system as set forth in claim 15 wherein said maximum NOx storage capacity of said device is determined based on an operating condition.

19. The system as set forth in claim 18 wherein said operating condition is a device temperature.

* * * * *